Jan. 31, 1961

K. J. RADIMER 2,970,092

PROCESS FOR THE PRODUCTION OF
FLUORINE-CONTAINING COMPOUNDS

Filed April 24, 1956

INVENTOR.
KENNETH J. RADIMER
BY
ATTORNEYS
PATENT AGENT

2,970,092
PROCESS FOR THE PRODUCTION OF FLUORINE-CONTAINING COMPOUNDS

Kenneth J. Radimer, Little Falls, N.J., assignor, by mesne assignments, to Minnesota Mining and Manufacturing Company, St. Paul, Minn., a corporation of Delaware Filed Apr. 24, 1956, Ser. No. 580,259

18 Claims. (Cl. 204—62)

The present invention relates to a novel and improved process for the production of fluorine-containing organic compounds. In one aspect this invention relates to an improved process for the production of compounds containing fluorine, bromine, and carbon. In another aspect this invention relates to the production of fluorobromoalkanes. In still another aspect this invention relates to a process for the simultaneous production of a fluorobromocarbon and another type of valuable product.

Fluorine-containing organic compounds such as the lower molecular weight normally gaseous and liquid fluorobromocarbons are known to possess value in many fields of industrial chemistry. For example, they are useful as refrigerants, dielectrics, fire-extinguishing materials and propellants. They are useful as intermediates for the production of plastics and synthetic elastomers. In many instances, a wider commercial application of such compounds has been limited due to the difficulty in their preparation, the presently employed processes involving many chemical and mechanical steps and the utilization of costly starting materials. In many instances the full utilization of the starting material is not realized, thereby increasing the cost of manufacture of the fluorobromocarbons.

It is an object of the present invention to provide a novel and improved process for the production of fluorine-containing organic compounds.

Another object is to provide a process for the production of fluorine and bromine containing organic compounds which process is accompanied by the minimum formation of undesirable by-products.

Another object is to provide a process for the production of fluorobromocarbons which process is commercially feasible, economical, and leads to the maximum utilization of the starting material.

Another object is to provide a novel process for the production of fluorobromoalkanes having from one to about ten carbon atoms per molecule which process utilizes starting materials from which the fluorobromoalkanes are produced as well as other valuable products.

Still another object is to provide a novel process for the simultaneous production of a fluorobromocarbon and an elemental metal.

Various other objects and advantages of this invention will become apparent to those skilled in the art from the accompanying description and disclosure.

Accordingly, these objects are accomplished by the process which comprises passing an electric current through a melt of an inorganic compound of fluorine containing at least one metal constituent in the presence of a carbon anode and added bromine under conditions such that there is no direct arcing between the electrodes, and recovering the fluorine-containing organic compound thereby produced as a product of the process. The process of this invention is an electrolysis reaction involving the passage of a current between a cathode and an anode through a melt of the fluoride as the electrolyte and is carried out at a substantially high cell potential, i.e. at a voltage which is at least 30 volts. It has been found that no electrolysis occurs and that no fluorine-containing organic compound is produced when an electric arc exists between the electrodes. This is attributed to the observation that when the arc exists, there is essentially no passage of current through the molten electrolyte. Whenever such an arc is seen to exist between the electrodes, the voltage drops to a value below 30 volts which low voltage is not sufficient to produce the anodic reaction hereindescribed.

By the term fluorobromocarbon as used herein is meant a compound containing fluorine, bromine, and carbon. The essential source of carbon in the product is the carbon anode. The major source of fluorine is the metal fluoride and the source of the bromine is added molecular bromine. The fluorobromocarbon is produced at or adjacent to the anode and thus the anode or vicinity of the anode must be in contact with the added bromine during the electrolysis reaction. Generally speaking, the process of this invention also leads to the deposition of a metal at the cathode which metal constitutes another valuable product of the process.

As indicated above, the electrolyte which also is the essential source of fluorine in the organic product produced in accordance with the present invention comprises an inorganic compound of fluorine having at least one metal constituent, which metal may be monovalent or polyvalent. It is to be understood that the electrolyte which is referred to herein as a metal fluoride also may contain certain non-metallic constituents in addition to the metal constituent. The classification of elements into metals and non-metals is well-known to the art. For example, Deming's Periodic Table used in his book entitled, "General Chemistry" (J. Wiley & Sons, Incorporated, 5th edition, pages 11–13) and in the Handbook of Chemistry and Physics, 23rd edition (1939), page 346, shows that the metals are the elements of group I having an atomic number higher than one, groups II, III–B, IV–B, V–B, VI–B, VII–B, and VIII; and the elements of groups III–A, IV–A, V–A, VI–A which have atomic numbers above 5, 14, 33, and 52, respectively. Of the remaining elements which are correspondingly classified as non-metals, any one having a positive valence may suitably be employed as the non-metallic constituent of the electrolyte when it is desired to have such a constituent present, provided that it is employed in its positive valence state and preferably in its highest state of oxidation. The preferred non-metallic constituents are: boron (atomic number 5)—group III–A; carbon (atomic number 6) and silicon (atomic number 14) of group IV–A; phosphorus (atomic number 15) of group V–A; and the elements of group VI–A of atomic numbers 16 to 52, inclusive.

The metal fluoride may be a binary fluoride, i.e. a compound containing only two constituents, namely fluorine and a metal, or it may be a complex fluoride, i.e. a compound containing fluorine, a metal, and a non-metal or second metal constituent such as in the ternary fluorides. Typical examples of suitable metal fluorides which are used as the electrolyte in accordance with the present invention are: lithium fluoride, sodium fluoride, potassium fluoride, cesium fluoride, beryllium fluoride, magnesium fluoride, calcium fluoride, strontium fluoride, barium fluoride, sodium fluoaluminate, aluminum trifluoride, titanium trifluoride, thalium fluoride, vanadium trifluoride, bismuth fluoride, antimony trifluoride, antimony pentafluoride, rubidium fluoride, columbium fluoride, potassium fluocolumbate, molybdenum trifluoride, barium fluosilicate, cesium fluosilicate, potassium fluosilicate, potassium fluogermanate, sodium fluoborate, potassium fluozirconate, potassium fluotantalate and potassium fluotitanate.

It is to be understood that the above metal fluorides may be used singly or in admixture without departing from the scope of this invention. It is sometimes desirable to reduce the melting point of the electrolyte by employing a eutectic mixture of metal fluorides which mixture may be as complex as desired, and to employ such mixtures as solvents or suspending agents for a metal fluoride undergoing electrolysis. For example, eutectic mixtures of any two or more of NaF, KF, $CaF_2$, $MgF_2$, $AlF_3$, $BaF_2$, $Na_3AlF_6$, etc. may be employed.

Typical examples of specific eutectic mixtures and their melting points which are advantageously employed as the electrolyte in the process of this invention are as follows where the concentration of each ingredient of the mixture is expressed in weight percent: calcium fluoride (49%) and sodium fluoride (51%)—melting point 810° C.; sodium fluoride (40%), and potassium fluoride (60%)—melting point 722° C.; calcium fluoride (14%), sodium fluoride (36%) and potassium fluoride (50%)—melting point 682° C.; calcium fluoride (20%), sodium fluoride (22%) and aluminum trifluoride (58%)—melting point 740° C.; sodium fluoride (15%), barium fluoride (63%) and magnesium fluoride (22%)—melting point 835° C.; potassium fluoride (69%) and lithium fluoride (31%)—melting point 492° C.; potassium fluoride (23%) and calcium fluoride (77%)—melting point 1060° C.; and lithium fluoride (64%) and magnesium fluoride (36%)—melting point 735° C. It is within the scope of this invention to dissolve or suspend a fluoride of a less basic metal (i.e. a more noble metal) in another fluoride or mixture of fluorides of a more basic metal. Thus, for example, a mixture of calcium fluoride and potassium fluoride may be used as a solvent for aluminum trifluoride. When such a mixture is electrolyzed as described herein, the less basic metal, i.e. aluminum, is formed at the cathode and is recovered as a product of the process.

The electrolyte is substantially free of oxygen-containing compounds such as metal oxides and oxy fluorometallates in order to prevent the formation of oxides of carbon instead of the desired fluorobromocarbon. However, the electrolyte may contain certain non-oxygen-containing compounds in addition to the metal fluorides, such as calcium carbide, without departing from the scope of this invention.

The process of this invention is carried out in a suitably designed electrolytic cell provided with a cathode and a carbon anode, a means for introducing bromine into the cell so that it is brought into contact with the carbon anode and a means for collecting and removing the fluorine-containing organic compound as it is formed. The carbon anode may be made of crystalline or amorphous carbon and is preferably made of ordinary commercial baked carbon. The activity or state of subdivision of the carbon is apparently of little consequence for the successful production of the fluorobromocarbon, but the carbon, of course, must possess sufficient electrical conductivity. The carbon need not be rigorously pure and may contain the normal ash content of commercial carbon or graphite. The anode may constitute the entire inner lining of the cell or any portion thereof, although for more facile manipulation and operation of the electrolysis process described herein, the anode is generally in the form of a pipe, rod, or plate which can be immersed in the electrolyte. It is preferred that the anode be in the form of a hollow carbon rod or plate or porous carbon, through which the added bromine may be conveniently introduced during the electrolysis reaction. The end of the hollow anode which is immersed in the electrolyte may be open, perforated, porous, or packed with carbon rods or pellets without departing from the scope of this invention. In order to obtain an increased surface area for the reaction between the carbon anode, metallic fluoride and bromine, a hollow anode packed with carbon rods or pellets is employed; or a perforated or porous carbon rod is employed so that the bromine which is added through such an anode, comes into contact with fluoride not only at the end in direct contact with the electrolyte, but also along the entire outer surface of the anode since the added halogen thereby can pass through the pores or perforations of the anode. When any one of these types of hollow anodes is employed, it is recommended that the rate of flow of added bromine be high enough to prevent the flow of molten electrolyte into the anode.

The bromine may be charged to the electrolysis cell in pure concentrated form or in admixture with an inert diluent gas such as helium. In carrying out the process of this invention, the added bromine is generally contacted with an excess and actually infinite source of carbon and metallic fluoride. The desired concentration or rate of flow of bromine is most conveniently determined by operating the cell for a period of time until a substantial amount of fluorobromocarbon product is collected. The product is then analyzed by mass spectrometer analysis, for example, to determine the percent of various compounds containing fluorine, carbon and bromine which it contains. The rate of flow and concentration of added bromine is then adjusted accordingly depending upon whether or not more or less of the added halogen is desired in the product. The rate at which the bromine is introduced into the cell may vary over relatively wide limits without departing from the scope of this invention. For example, the bromine may be charged to the electrolysis cell at a rate of between about 0.0001 and about 1.0 gram equivalent per minute in using a 5 ampere cell. When it is desired to obtain a product containing a major proportion of fluorine as compared to bromine such as $CF_3Br$, the bromine is generally charged to the electrolysis cell at a rate of between about 0.001 and about 0.1 gram equivalent weights per minute. The bromine is usually carried into the cell in a stream of inert gas flowing at a rate of between about 50 and about 500 ml. per minute, although higher and lower rates also may be employed as desired.

Each of the reactants, namely the electrolyte, carbon anode, and bromine should preferably be substantially anhydrous, although the process can tolerate the presence of some water. The atmosphere which comes into contact with the reactants should also be substantially free of moisture and oxygen and preferably constitutes an inert gas such as nitrogen or helium. The absence of moisture is preferred in order to prevent the conversion of the metal fluoride to oxides, the presence of which results in the formation of the less desirable oxides of carbon which must of necessity be removed from the effluent gas when pure fluorobromocarbons are desired as the product of the process of this invention.

The negative electrode or cathode may be composed of any suitable electrically conductive material such as carbon, silicon and tellurium, a metal such as iron, zinc, chromium, copper, lead, nickel, manganese, barium, tin, strontium, cobalt, cadmium, cerium, and is preferably composed of a metal having a high melting point such as tungsten, titanium, and tantalum, for example, and alloys thereof. It has been found that the yield of fluorobromocarbon produced at the anode is not appreciably affected by the type of cathode which is employed. The choice of material for the cathode is sometimes determined by consideration of the degree of purity desired in the metal product which is deposited at the cathode during the electrolysis. It has been found that when a carbon cathode is employed, metals deposited in powder form at the cathode are oftentimes contaminated with carbon. Thus, for example, when a pure metal is desired as a second type product of the electrolysis, it is preferred whenever possible to employ a cathode material which is the same as the metal which will be deposited during the electrolysis reaction or which will not lead to contamination of the metal. The cathode may be molten (either floating or submerged in electrolyte) or in the form of a solid or hollow pipe or plate which can be immersed in the electrolyte, or it may constitute any portion or all of the inner lining of the electrolytic cell.

It is to be understood that multiple electrodes may be employed without departing from the scope of this invention. For example, more than one carbon anode positioned in parallel or in some other manner may be used advantageously in order to obtain increased surface area for the site of reaction between the carbon, metallic fluoride, and bromine. The position of the anode with respect to the cathode may vary. For example, they may be positioned in the electrolyte so that they are parallel on the same or different levels, or they may be aligned in a coaxial or non-coaxial manner. However, in no case should they be close enough so that an electric arc is struck spontaneously between them during the electrolysis reaction inasmuch as it has been found that when such arcing occurs, the production of fluorine-containing organic compound ceases almost immediately. This is attributed to the fact that when the arc is struck between the electrodes, the electric current becomes localized in the path of the arc, with the result that substantially no current is carried by the molten electrolyte, and thus the hereindescribed anodic and cathodic reactions cease. Various methods may be employed to prevent arcing between the electrodes once the electrolysis reaction of this invention has commenced. One method involves maintaining a sufficient distance between the anode and cathode during the electrolysis reaction. Another method which also is helpful in preventing spontaneous arcing between the anode and cathode involves the positioning of a shield made of a suitable electrical insulating material part way between the electrodes and in such a manner that any gas space within the cell between the cathode and anode above the surface of electrolyte is separated. Such a suitable electrically non-conducting barrier is solidified electrolyte maintained in the solid state by means of localized cooling. Such cooling may be obtained by using metallic conductors of circulating coolant fluids or by using metal members with a radiating surface in the cooler space above the electrolyte level.

Both direct and alternating currents can be used in the process of this invention. When only an alternating current is employed, each electrode alternately functions as a cathode and as an anode, but the operating conditions permit the release of fluorobromocarbons. In order to obtain the maximum efficiency from the cell when an alternating current is employed, both electrodes are brought into contact with added bromine and are made of carbon so that the production of the fluorobromocarbon is continuous. However, even then each electrode as it functions as the cathode may become partially or completely coated with metal and thus the cell may not be operable for very long periods of time without the necessity of examining the electrodes at intervals and removing the metal from at least one of the electrodes, whenever necessary, to obtain an exposed carbon surface.

The use of direct currents is greatly preferred inasmuch as the process can thereby be more readily controlled to yield a desired result. In the case of normal direct current operation, each cathode and anode continuously function as such at a uniform voltage although the voltage can be varied during the run for optimal operation, and the cathode need not be of carbon in order to obtain maximum efficiency of operation and continuous production of fluorobromocarbons. Another advantage for the use of direct current is that provision need only be made at the anode for the introduction of the added bromine. Pulsating unidirectional current and superimposed alternating current on direct current also can be used and are to be regarded as types of direct current. When direct current is employed, it may sometimes be advantageous to switch the electrode terminals so that the electrodes are functioning alternately as anodes and cathodes.

The current densities which are employed in operating the electrolysis process of this invention may vary over a relatively wide range without departing from the scope of this invention. Current densities of from about 0.01 to about 10 amperes per square centimeter of anode surface are usually employed in carrying out the process of this invention, although a current density of between about 0.5 and about 5 amperes per square centimeter of anode surface is preferred.

As previously mentioned, a substantially high cell potential is employed in the electrolysis process of this invention, i.e. a voltage of at least 30 volts. The process is generally conducted at a cell potential of between about 50 and about 120 volts although cell potentials as high as 250 volts or higher may be employed without departing from the scope of this invention. When cell potentials ranging from 15 to 30 volts are employed, it has been observed that the process leads to at best only very low conversions and usually only trace or zero percent yields of the fluorobromocarbon, and that no deposition of metal product is obtained. At a voltage of less than 15 volts essentially no detectable electrolysis of the metal fluoride takes place.

The temperature at which the reaction between the fluoride, added bromine and carbon anode takes place to form the fluorobromocarbon product may vary over a relatively wide range and it depends to a large extent upon the melting point of the electrolyte. As indicated above, the metal fluoride functions as the source of fluorine in the organic product produced at the anode, and it also functions as the electrolyte or carrier of current between the anode and cathode. Thus, sufficient heat must be applied to the reaction medium to melt at least the portion of the metal fluoride through which the current is to pass. The temperature at which the anodic reaction is actually taking place depends to a large extent, therefore, upon the melting point of the electrolyte, and is generally between about 100° C. and about 2,000° C. and is usually a temperature above 400° C. and below 1,200° C. Generally the heat associated with the electrolysis is generated mostly at or near the surface of the anode. It is generally sufficient to maintain the electrolyte in the molten state, and application of heat by some other means during electrolysis is not required. However, external heat may be supplied, such as by a gas furnace, without departing from the scope of this invention.

The process of the present invention may be carried out at pressures ranging from about a few millimeters of mercury to about 10 atmospheres and is generally carried out at substantially atmospheric pressure.

The source of heat initially required to melt the electrolyte may be an external source such as an open flame, an electrically or gas heated oven or furnace, etc., or an internal source of heat supplied by an induction or reverbatory furnace. It has been found that a convenient way of melting the electrolyte and especially those having a melting point above about 700° C., is to contact the anode and cathode so that an electric arc is struck between them. The temperature generated by the arc, i.e. about 3,000° C. to about 6,000° C., is high enough to cause initial melting of the electrolytes employed herein. As stated hereinabove, there is no production of fluorobromocarbons at the anode while such an arc is in operation. It is only when conditions are such that the arcing between the electrodes ceases, that the electrolysis process of this invention and subsequent formation of fluoro bromocarbons commences. Thus the process of this invention is operable only when carried out under non-arcing conditions by which is meant under conditions such that there is no arc between the anode and cathode. The tiny arcs which are sometimes observed between the anode and molten electrolyte, on the other hand, do not interfere with the successful operation of the electrolysis reaction herein described.

Generally speaking, the organic products produced and recovered in accordance with the process of this invention comprise a mixture of completely halogenated fluorine-containing organic compounds, i.e. perfluorobromocarbons having from 1 to about 10 carbon atoms per molecule which may be arranged in open straight, or branched chains, or in a cyclic fashion. In order to prevent side reactions such as breakdown of a considerable portion of the higher molecular weight organic products to $C_2$ and lower molecular weight products, rapid quenching of the fluorine-containing organic product mixture is recommended. Rapid quenching of the product is especially advantageous when operating at a temperature above 700° C., and may be accomplished by introducing a cold jet of an inert gas such as helium in the vicinity of the anode.

Perfluoromethane and perfluoroethane are sometimes present in the reaction product. The reaction product also may contain unreacted bromine which can be removed by passing the crude reaction product through liquid scrubbing solutions such as an aqueous alkaline solution. The reaction mixture containing the various perhalogenated organic compounds can be separated into individual compounds by passing it through cold condensers and by fractionating the condensate.

When the metal which is produced at the cathode during the electrolysis process described herein, deposits on the cathode as a solid mass, it is conveniently removed by scraping the surface of the cathode by any suitable means. When the metal deposits as a non-adherent powder, it is sometimes necessary to allow the mixture of metal powder and electrolyte to cool, following which the mixture is ground and leached to obtain the pure metal powder. When the metal product is in the molten state at the temperature of the electrolysis reaction, it is conveniently removed by tapping from either above or below the electrolyte, depending upon whether or not the molten metal is more or less dense than the molten electrolyte. When the metal is gaseous at the temperature of operation of the cell, the cathode compartment is provided with a cover having a condenser thereon, and the metal vapors are conducted from the enclosed cathode compartment, condensed at a temperature intermediate between the melting point and boiling point of the metal, and allowed to collect and form solid pigs, all steps being carried out under an inert atmosphere.

The accompanying figures are presented as a better understanding of the present invention.

Figure 1:
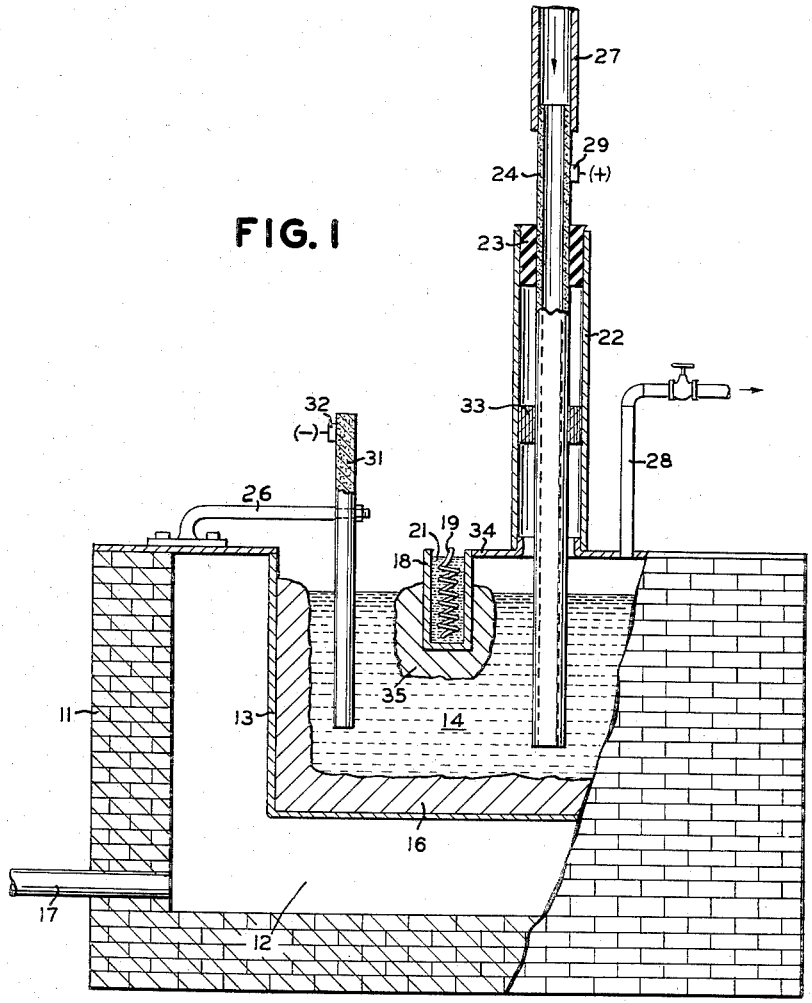
Figure 1 represents a diagrammatical elevational view, partly in cross section, of one embodiment of a suitable electrolysis cell for operating the process of this invention wherein the electrodes are arranged in a parallel configuration.

The essential parts of the apparatus illustrated in the accompanying Figure 1 are the cell body 13 to which a partial cell cover 34 is fastened, the hollow carbon anode 24 through which the bromine is fed into the cell, the cathode 31, and conduit 28 by means of which the fluorobromocarbon product is passed from the cell into a receiver as it is formed.

The cell body 13 which serves as the receptacle for the electrolyte may be rectangular or circular in shape and is preferably fabricated from any material which is relatively resistant to corrosive action of any molten electrolyte with which it may come into contact during operation of the cell and which remains intact at the temperature at which the cell is operated. The cell body 13 is preferably made of stainless steel, copper, Monel, nickel, or iron boiler plate. It is pointed out that in order to minimize heat loss from the cell as well as to minimize attack of the inner wall of the cell body by molten electrolyte, it is preferred that the interior of the cell body be in direct contact with solid electrolyte during operation of the cell. This is accomplished by positioning the cell body 13 in a furnace 11 which is preferably made of a refractory material such as brick. During actual operation of the cell the free space 12 between the cell body and the refractory material of the furnace is heated by any suitable means such as an air-gas torch 17 to a temperature which is below the melting point of the electrolyte. In this manner that portion of electrolyte 16 in contact with the cell body 13 is in its non-corrosive or solid state, and heat loss from the cell is minimized. The furnace also serves as a convenient means for supplying sufficient heat to the cell to melt the electrolyte at the start of the process.

The cell body 13 is provided with pipe 22 which may be an integral part of the cell cover 34 or it may be fastened to the cell cover by any suitable means such as bolts. The hollow carbon anode 24 is fed into the cell through pipe 22 and is conveniently held in position by a rubber stopper 23 which stopper also serves as a gas-tight seal to prevent loss of gaseous fluorobromocarbon from the cell. The carbon anode 24 is connected to the source of current at 29 and is held centered in pipe 22 by means of asbestos tape packing 33 in order to prevent contact between the anode and pipe 22 and thereby avoid short circuiting of the cell. The inert diluent gas, if used, and bromine are introduced downwardly into the hollow anode 24 by means of conduit 27 which conduit is suitably made of Monel and is connected to a source of bromine not shown.

The cell body also is provided with the solid cathode 31 which is connected to the source of electric current at 32 and is composed of carbon or a common metal such as iron. The cathode 31 is connected to the body of the apparatus by means of the connecting rod 26 which is electrically insulated therefrom.

The cell as illustrated in Figure 1 is particularly suited to operation when the metal which is formed at the cathode has a lower density than that of the molten electrolyte 14 and which metal also will not ignite when in contact with air. Such a metal, if either in the solid or liquid state, is prevented from floating over to the area of the anode by means of a barrier which separates the area near, at and above the surface of the molten electrolyte into separate compartments which are conveniently referred to as the upper cathode and anode compartments. Such a barrier is preferably an electrically non-conducting barrier and, as shown in the accompanying Figure 1, comprises the metal pocket 18 which is suitably made of steel and may be an integral part of the cell cover 34. The metal pocket contains a suitable heat transfer medium 21 such as solid or molten metal which is not oxidized readily. A steel coil 19 through which a coolant such as air is circulated, is positioned in the heat transfer medium contained in the metal pocket 18. By use of a heat transfer medium having a temperature below that of the melting point of the electrolyte, the portion of electrolyte 35 which surrounds 18 is thereby solidified and acts as a means for preventing the passage of a metal deposit which is lighter than the electrolyte from the cathode to the anode compartment. Such a barrier is preferably composed of an electrically non-conducting material such as solid electrolyte inasmuch as such a barrier also serves as an aid in preventing spontaneous arcing between the cathode and anode.

During operation of the cell the fluorobromocarbon product is formed and evolved at the anode and is removed from the cell by means of conduit 28 whereupon it is passed into suitable scrubbing baths to remove unreacted halogen and is fractionated in conventional distillation apparatus into its individual components.

The actual operation of an electrolysis cell of the type illustrated by the accompanying Figure 1 is described in the following Examples 1, 2, and 3 which examples are not to be construed as unnecessarily limiting to the present invention.

*Example 1*

This example illustrates the production of fluorobromocarbons by the electrolysis of magnesium fluoride in the presence of added bromine.

The type of cell illustrated in Figure 1 and above discussed is fitted with an iron cathode and a hollow carbon anode and is heated externally to a temperature of about 950° C. by means of the brick pile furnace. The cell is then charged with a powdered admixture containing 45% by weight of magnesium fluoride, 45% by weight of barium fluoride, and 10% by weight of sodium fluoride, the temperature of the furnace being maintained high enough to melt this mixture as it is added to the cell. This mixture of metal fluoride is added until the level of the molten electrolyte in the cell is above the bottom of the steel pocket 18 of Figure 1. The furnace is then cooled to a temperature of about 400° C. whereupon the electrolyte next to the wall of the cell body solidifies. During this operation air is circulated through the coil 19 which is immersed in silver solder contained in the steel pocket 18 at a rate sufficient to solidify the electrolyte 35 which surrounds 18. There is no evolution of fluorine-containing organic compounds as the electrolyte is melted.

Bromine in admixture with helium is then charged to the electrolysis cell through the hollow carbon anode at a rate of about 950 ml. per minute, a direct current is applied to the cell, and the reaction is carried out at atmospheric pressure and at a current density of about 1 ampere per square centimeter of anode surface and at a cell potential of about 90 volts. The approximate temperature of the molten electrolyte is about 950° C. A mixture of fluorobromocarbons is produced at the anode as a product of this reaction and is removed by means of conduit 28 and collected. In this operation elemental magnesium forms at the cathode and inasmuch as it is less dense than the molten electrolyte, the magnesium rises to the surface of the electrolyte, collects in the upper cathode compartment and is ladled off at intervals.

*Example 2*

This example illustrates the production of fluorobromocarbons by the electrolysis of potassium fluoride in the presence of added bromine.

The type of cell illustrated in Figure 1 and discussed hereinabove is fitted with an iron cathode and a hollow carbon anode and is heated externally to a temperature of about 950° C. by means of the brick-pile furnace. The cell is then charged with potassium fluoride which becomes molten as it is added. Sufficient KF is added until the level of the molten electrolyte is above the bottom of the steel pocket 18 of Figure 1. A cover provided with a condenser is then bolted over the cathode compartment. The furnace is then cooled to a temperature of about 400° C. whereupon the molten electrolyte next to the wall of the cell body solidifies. During this operation air is circulated through the coil 19 which is immersed in silver solder contained in the steel pocket 18 at a rate sufficient to solidify the surrounding electrolyte 35. Bromine in admixture with helium is then charged to the cell at a rate of about 850 ml. per minute through the hollow carbon anode, a source of direct current is applied to the cell, and the reaction is carried out at a current density of about 1 ampere per square centimeter of anode surface and at a voltage of about 65 volts. A mixture of fluorobromocarbons is evolved at the anode almost as soon as the current is supplied to the cell, which mixture is removed from the cell by means of conduit 28 and is collected. The potassium vapor which also forms as a product of the process is condensed in the condenser and the liquid metal is allowed to flow under an inert atmosphere into molds where it is solidified.

*Example 3*

This example illustrates the production of fluorobromocarbons by the electrolysis of calcium fluoride in the presence of added bromine.

The type of cell illustrated in Figure 1 and discussed hereinabove is fitted with an iron cathode and a hollow carbon anode and is heated externally to a temperature of about 950° C. by means of the brick-pile furnace. The cell is then charged with an admixture containing 45% by weight of calcium fluoride, 10% by weight of barium fluoride and 45% by weight of sodium fluoride which becomes molten as it is added. Sufficient electrolyte is added until the level of the molten electrolyte is above the bottom of the steel pocket 18 of Figure 1. A cover provided with a tap-off pipe is then bolted over the cathode compartment. The furnace is then cooled to a temperature of about 400° C. whereupon the electrolyte next to the wall of the cell body solidifies. During this operation air is circulated through the coil 19 which is immersed in silver solder contained in the steel pocket 18 at a rate sufficient to solidify the surrounding electrolyte 35.

Bromine in admixture with helium is then charged to the cell through the hollow carbon anode, a source of direct current is applied to the cell, and the reaction is carried out at a current density of about 2 amperes per square centimeter of anode surface and at a voltage of about 70 volts. A mixture of fluorobromocarbons is evolved at the anode almost as soon as the current is supplied to the cell which mixture is allowed to pass from the cell by means of conduit 28 and is collected as a product of the process. The molten calcium which collects at the surface of the electrolyte in the enclosed upper cathode compartment is removed by means of the tap-off pipe maintained at a temperature of about 850° C. and positioned in the electrolyte in a manner such that only the calcium metal runs through the pipe as it is formed.

Figure 2:
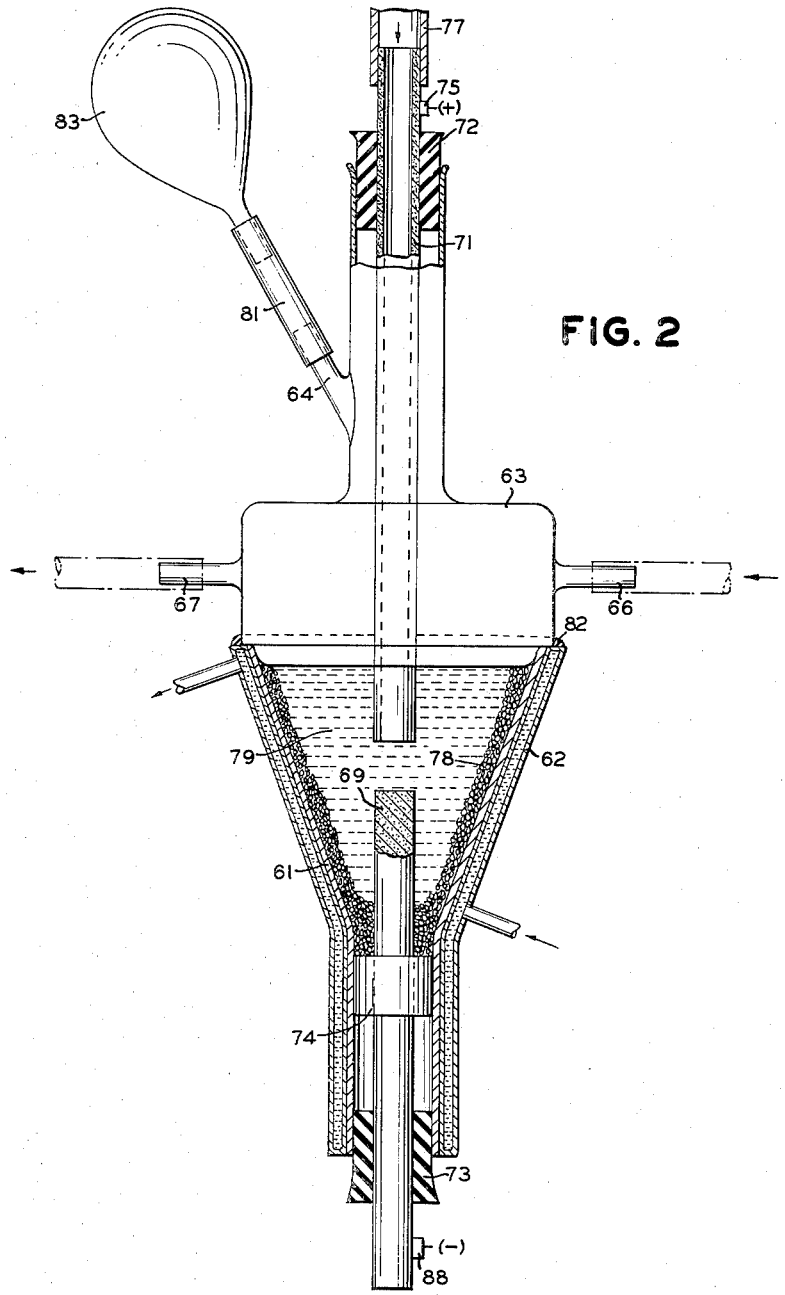
Figure 2 represents a diagrammatical elevational view, partly in cross section, of one embodiment of a suitable electrolysis cell for operating the process of this invention wherein the electrodes are arranged in a coaxial manner.

The essential parts of the apparatus illustrated in the accompanying Figure 2 are the funnelled shaped copper cell body 61 having the water cooled jacket 62, a glass cell cover 63, a hollow carbon rod 71 having a ½" inner diameter and a ¾" outer diameter as the anode, a solid carbon rod 69 having a ½" diameter as the cathode, conduit 77 for introducing the bromine downward through the hollow anode, and an outlet 67 by means of which the fluorobromocarbon product is removed from the cell as it is produced.

In setting up the cell for carrying out the process of this invention, the cathode 69 is inserted upwardly through the stem of the copper funnel and is held in place by means of the bored rubber stopper 73. Asbestos tape 74 is packed around the lower portion of the cathode in the stem of the funnel and serves to keep the cathode centered in the apparatus so that short circuits between the cathode and the cell are avoided. The Pyrex glass cover 63 having an open upper end is then placed on the upper flange of the cell body and is tightly held to it by a Gooch rubber connection 82. The solid metal fluoride electrolyte is then charged to the cell from container 83 by means of conduit 64 which is connected to the electrolyte container 83 by means of thin wall rubber tubing 81. The electrolyte container 83 may be lowered or raised at will depending upon whether or not it is desired to add additional electrolyte at any stage of the process. The electrolyte is packed around the cathode maintaining the electrolyte level below the top surface of the cathode. The hollow anode 71 is then inserted downwardly into the neck of the glass cover and is held in place by means of the bored rubber stopper 72. The anode is then lowered until it makes contact with the cathode and a direct source of current is then applied to the cell by means of battery clips at 75 and 88. An electric arc is then struck between the ends of the electrodes by breaking contact between them. When a brilliant arc is obtained, additional solid electrolyte is added to the cell through conduit 64 by raising the container 83. The electrolyte becomes molten in the vicinity of the arc and additional electrolyte is added to the cell until there is enough liquid electrolyte 79 to completely immerse the ends of the carbon anode 71 and the carbon cathode 69. This latter operation causes the arcing to stop. The cathode and anode are then moved apart gradually as more electrolyte is added and melted and the added halogen is charged to the cell in a stream of helium downward through conduit 77 and the hollow carbon anode. The ends of the electrodes are moved apart so as to have at least a ½″ gap between them in order to prevent spontaneous arcing once the electrolysis reaction has commenced. During operation of the cell, cold water is continuously passed through the jacket 62 in order to keep electrolyte 78 next to the copper reactor in the solid state so as to prevent the attack of the copper by molten electrolyte or the melting of the reactor which might result from its reaching the temperature of the molten electrolyte. At any stage of the process an inert gas such as helium may be charged to the electrolysis cell by means of conduit 66 having a stopcock thereon which stopcock is not shown. Thus, for example, the cell may be swept with helium to obtain an inert atmosphere within the cell prior to introduction of the electrolyte.

As indicated above, the low voltage (i.e. below 30 volts) which is apparent when the arc is in operation increases markedly when the operation of the cell changes from an arcing process to an electrolytic process, there being essentially no formation of metal or fluorine-containing organic compounds while the arc is in operation. As soon as the arc between the electrodes is removed, the voltage of the cell increases to a value above 30 volts and a mixture of halocarbons is evolved and is allowed to pass from the cell as it is formed by means of conduit 67 whereupon the mixture is collected in suitable apparatus and distilled into its various components.

The following examples are offered as a further and better understanding of the present invention and are not to be construed as unnecessarily limiting thereto. The percent yields given in the following examples are based on the number of coulombs used and were calculated using the following formula:

Percent yield = 100 ×

$$\left[\frac{\text{moles of product} \times \text{number of F atoms in product}}{\frac{\text{amperes} \times \text{time (seconds)}}{96,500}}\right]$$

Example 4

The electrolysis cell illustrated in the accompanying Figure 2 was charged with sodium fluoaluminate which was melted as described above in discussing Figure 2 by striking an electric arc between the ends of the hollow carbon anode and carbon cathode. A current of about 4.5 amperes was then applied to the cell for about 30 minutes during which time a stream of helium bearing gaseous bromine was passed downwardly through the hollow anode at a rate of about 0.003 gram equivalent per minute. During this operation a gap of not more than ⅜″ of an inch was maintained between the ends of the cathode and anode in order to maintain the presence of the arc across the ends of the electrodes. The cell potential averaged about 25 volts during this operation. The gas evolved from the cell under these conditions was collected and upon mass spectrometer analysis, the gaseous product was found to contain only helium and bromine and not even the slightest trace of a fluorine-containing organic compound. No metal was deposited at the cathode during this operation. When the electrodes were separated so that there was a gap of at least ½″ between the ends of the electrodes, the arcing from anode to cathode ceased and the cell potential rose to about 70 volts whereupon gaseous product containing fluorocarbons and fluorobromocarbons was evolved from the cell and a globule of aluminum metal was observed at the cathode.

Example 5

This example further illustrates the formation of fluorobromocarbons by the electrolysis of sodium fluoaluminate in the presence of bromine.

The electrolysis reaction of this example was carried out in the above-described cell illustrated by Figure 2 using the indicated hollow carbon anode and the solid carbon cathode. The cell was charged with sodium fluoaluminate which was melted as described above using an electric arc as the source of heat required to melt this electrolyte. When sufficient molten electrolyte was obtained to immerse the ends of the electrodes, the arc stopped and the electrodes were moved apart gradually so that at least ½″ existed between the ends of the electrodes. Bromine vapor was passed through the hollow carbon anode in a stream of helium at a rate of about 0.0064 gram equivalents per minute. The cell was operated using a direct current of about 6 amperes and for a reaction time of about 16 minutes. The cell potential averaged about 90 volts during the electrolysis. A sample of the reaction product which was evolved during this reaction was collected in a glass sample bottle and was analyzed by mass spectrometer analysis which showed the gaseous product to contain yields of 25% carbon tetrafluoride, 23.1% trifluoromethyl bromide and 19% hexafluoroethane. This experiment was repeated except that bromine was passed through the anode at a rate of 0.026 gram equivalents per minute. Only $CF_3Br$ was formed at the anode, a yield of 31.4% being obtained; and about a 68% yield of aluminum was recovered from the surface of the cathode.

Example 6

This example illustrates the formation of fluorobromocarbons by the electrolysis of sodium fluoaluminate in the presence of bromine.

The electrolysis reaction of this example is carried out in the above-described cell illustrated by Figure 2 using the indicated hollow carbon anode and solid carbon cathode. The cell is charged with an admixture containing 50 percent by weight of sodium fluoaluminate, 25% by weight of sodium fluoride, and 25% by weight of potassium fluoride which admixture is melted as described above using an electric arc as the source of heat required to melt this electrolyte. After conditions are adjusted as described in Example 5 above so that the arc ceases, a stream of helium gas bearing bromine is introduced downwardly through the hollow carbon anode at a rate of about 0.003 gram equivalent of free bromine per minute. The electrolysis reaction is carried out at a current density of about one ampere per square centimeter of anode surface and at a cell potential of about 65 volts. The gaseous product which is evolved from the cell and collected during this operation contains bromofluorocarbons and some fluorocarbons and aluminum is produced at the cathode.

Example 7

This example illustrates the production of fluorobromocarbons by the electrolysis of aluminum trifluoride in the presence of bromine.

The electrolysis reaction of this example is carried out in the above-described cell illustrated by Figure 2 using the indicated hollow carbon anode and solid carbon cathode. The cell is then charged with an admixture containing about 30% by weight of aluminum trifluoride and about 70% by weight of potassium fluoride which admixture is melted as described aboove using an electric arc as the source of heat required to melt this electrolyte. After conditions are adjusted as described in Example 5 above so that the arc ceases, a stream of helium gas bearing bromine is introduced downwardly through the hollow carbon anode at a rate of about 0.003 gram equivalent of free bromine per minute. The electrolysis reaction is carried out at a current density of about one ampere per square centimeter of anode surface and at a cell potential of about 65 volts. The gaseous product which is evolved from the cell and collected during this operation contains bromofluorocarbons and some fluorocarbons and aluminum metal is produced at the cathode.

Example 8

This example illustrates the production of fluorobromocarbons by the electrolysis of titanium trifluoride in the presence of bromine.

The electrolysis reaction of this example is carried out in the above-described cell illustrated by Figure 2 using the indicated hollow carbon anode and solid carbon cathode. The cell is charged with an admixture containing 30% by weight of titanium trifluoride and 70% by weight of sodium fluoride, which admixture is melted as described above using an electric arc as the source of heat required to melt this electrolyte. After conditions are adjusted as described in Example 5 above so that the arc ceases, a stream of helium gas bearing bromine is introduced downwardly through the hollow carbon anode at a rate of about 0.003 gram equivalent of free bromine per minute. The electrolysis reaction is carried out at a current density of about one ampere per square centimeter of anode surface and at a cell potential of about 65 volts. The gaseous product which is evolved from the cell during this operation contains bromofluorocarbons and some fluorocarbons and titanium is produced at the cathode. The titanium metal formed as a result of reaction at the cathode settles to the bottom of the cell as a powder, and may be recovered from the electrolyte at the end of the reaction by cooling the electrolyte, grinding it to a fine powder, followed by treatment with dilute hydrochloric acid to dissolve away the electrolyte and leaving the titanium metal as a product of the process.

Example 9

This example illustrates the production of fluorobromocarbons by the electrolysis of potassium fluosilicate in the presence of bromine.

The electrolysis reaction of this example is carried out in the above-described cell illustrated by Figure 2 using the indicated hollow carbon anode and solid carbon cathode. The cell is charged with an admixture containing about 5% by weight of sodium fluoride, 30% by weight of potassium fluoride, 15% by weight of lithium fluoride and 50% by weight of potassium fluosilicate, which admixture is melted as described above using an electric arc as the source of heat required to melt this electrolyte. After conditions are adjusted as described in Example 5 above so that the arc ceases, a stream of helium gas bearing bromine is introduced downwardly through the hollow carbon anode at a rate of about 0.01 gram equivalents of free bromine per minute. The electrolysis reaction is carried out at a current density of about one ampere per square centimeter of anode surface and at a cell potential of about 70 volts. The gaseous product which is evolved from the cell and collected during this operation contains bromofluorocarbons and some fluorocarbons and silicon is produced at the cathode. The silicon which is formed as a result of reaction at the cathode settles to the bottom of the cell as a powder. It may be recovered from the electrolyte at the end of the reaction by cooling the electrolyte, grinding it to a fine powder, followed by treatment with hydrogen fluoride solution to dissolve the electrolyte and leaving the silicon as a product of the process.

Example 10

This example illustrates the production of fluorobromocarbons by the electrolysis of potassium fluotantalate in the presence of bromine.

The electrolysis reaction of this example is carried out in the above-described cell illustrated by Figure 2 using the indicated hollow carbon anode and solid carbon cathode. The cell is charged with powdered potassium fluotantalate which is melted as described above using an electric arc as the source of heat required to melt this electrolyte. After conditions are adjusted as described in Example 5 above so that the arc ceases, a stream of helium gas bearing bromine is introduced downwardly through the hollow carbon anode at a rate of about 0.05 gram equivalent of free bromine per minute. The electrolysis reaction is carried out at a current density of about one ampere per square centimeter of anode surface and at a cell potential of about 65 volts. The gaseous product which is evolved from the cell and collected during this operation contains bromofluorocarbons and tantalum metal is produced at the cathode. The tantalum metal which formed as a result of reaction at the cathode settles to the bottom of the cell as a powder. It may be recovered from the electrolyte at the end of the reaction by cooling the electrolyte, grinding it to a fine powder, followed by treatment with aqua regia to dissolve the electrolyte and leaving the tantalum as a product of the process.

The process of the present invention may be carried out in a batchwise or continuous manner as desired. The preferred method of operation involves continuously charging bromine to the electrolysis cell as described hereinabove, accompanied by the continuous removal and collection of fluorobromocarbon product as it is formed at the anode.

As is apparent, the process of this invention is an electrolysis process involving the passage of current through a melt of an inorganic compound of fluorine containing at least one metal constituent between a cathode and carbon anode, said anode being in contact with added bromine, at a cell potential of at least 30 volts. The molten metal fluoride is substantially anhydrous and is substantially free of oxygen-containing compounds such as metal oxides. Once the electrolyte has been liquefied by and suitable means, the molten electrolyte carries the applied current between the electrodes, the electrolyte remains molten and the reaction proceeds as described herein without the necessity of external or internal heating. Various alterations and modifications of the conditions, apparatus, and reactants employed may become apparent to those skilled in the art without departing from the scope of this invention.

I claim:

1. A novel process for the electrolytic production of a fluorobromocarbon which comprises electrolyzing a substantially oxygen free melt of an inorganic compound of fluorine containing at least one metal constitutent in contact with a cathode and a carbon anode, and introducing, as the sole remaining reactant, gaseous molecular bromine into the melt in the vicinity of the anode to produce a fluorobromocarbon and recovering the fluorobromocarbon thereby produced as a product of the process.

2. The novel process of claim 1 in which said cathode is composed of carbon.

3. A novel process for the electrolytic production of a fluorobromocarbon which comprises electrolyzing a substantially oxygen free melt of a metal fluoride containing a polyvalent metal constituent in contact with a cathode and a carbon anode, and introducing, as the sole remaining reactant, gaseous molecular bromine into the melt in the vicinity of the anode to produce a fluorobromocarbon and recovering the fluorobromocarbon thereby produced as a product of the process.

4. A novel process for the electrolytic production of a fluorobromocarbon which comprises electrolyzing a substantially oxygen free melt of a metal fluoride containing a metal of group II of the periodic system in contact with a cathode and a carbon anode, and introducing, as the sole remaining reactant, gaseous molecular bromine into the melt in the vicinity of the anode to produce a fluorobromocarbon and recovering the fluorobromocarbon thereby produced as a product of the process.

5. A novel process for the electrolytic production of a fluorobromocarbon which comprises electrolyzing a substantially oxygen free melt of a metal fluoride containing a metal of group III of the periodic system in contact with a cathode and a carbon anode, and introducing, as the sole remaining reactant, gaseous molecular bromine into the melt in the vicinity of the anode to produce a fluorobromocarbon and recovering the fluorobromocarbon thereby produced as a product of the process.

6. A novel process for the electrolytic production of a fluorobromocarbon which comprises electrolyzing a substantially oxygen free melt of a metal fluoride containing a metal of group IV of the periodic system in contact with a cathode and a carbon anode, and introducing, as the sole remaining reactant, gaseous molecular bromine into the melt in the vicinity of the anode to produce a fluorobromocarbon and recovering the fluorobromocarbon thereby produced as a product of the process.

7. A novel process for the electrolytic production of a fluorobromocarbon which comprises electrolyzing a substantially oxygen free melt of a metal fluoride containing a metal of group V of the periodic system in contact with a cathode and a carbon anode, and introducing, as the sole remaining reactant, gaseous molecular bromine into the melt in the vicinity of the anode to produce a fluorobromocarbon and recovering the fluorobromocarbon thereby produced as a product of the process.

8. A novel process for the production of a fluorobromocarbon which comprises electrolyzing a substantially oxygen free melt of a metal fluoride at a cell potential of at least 30 volts in the presence of a carbon anode and introducing, as the sole remaining reactant, gaseous molecular bromine into the melt in the vicinity of the anode to produce a fluorobromocarbon and recovering the fluorobromocarbon thereby produced as a product of the process.

9. A novel process for the production of a fluorobromocarbon which comprises electrolyzing a substantially oxygen free melt containing magnesium fluoride at a cell potential of at least 30 volts in the presence of a carbon anode and introducing as the sole remaining reactant, gaseous molecular bromine into the melt in the vicinity of the anode to produce a fluorobromocarbon and recovering the fluorobromocarbon thereby produced as a product of the process.

10. A novel process for the production of a fluorobromocarbon which comprises electrolyzing a substantially oxygen free melt containing calcium fluoride at a cell potential of at least 30 volts in the presence of a carbon anode and introducing as the sole remaining reactant, gaseous molecular bromine into the melt in the vicinity of the anode to produce a fluorobromocarbon and recovering the fluorobromocarbon thereby produced as a product of the process.

11. A novel process for the production of a fluorobromocarbon which comprises electrolyzing a substantially oxygen free melt containing a fluoride of aluminum at a cell potential of at least 30 volts in the presence of a carbon anode and introducing as the sole remaining reactant, gaseous molecular bromine into the melt in the vicinity of the anode to produce a fluorobromocarbon and recovering the fluorobromocarbon thereby produced as a product of the process.

12. The novel process of claim 11 in which said fluoride of aluminum is sodium fluoaluminate.

13. A novel process for the production of a fluorobromocarbon which comprises electrolyzing a substantially oxygen free melt containing a fluoride of titanium at a cell potential of at least 30 volts in the presence of a carbon anode and introducing, as the sole remaining reactant, gaseous molecular bromine into the melt in the vicinity of the anode to produce a fluorobromocarbon and recovering the fluorobromocarbon thereby produced as a product of the process.

14. The novel process of claim 13 in which said fluoride of titanium is potassium fluotitanate.

15. A novel process for the production of a fluorobromocarbon which comprises electrolyzing a substantially oxygen free melt containing a fluoride of tantalum at a cell potential of at least 30 volts in the presence of a carbon anode and introducing, as the sole remaining reactant, gaseous molecular bromine into the melt in the vicinity of the anode to produce a fluorobromocarbon and recovering the fluorobromocarbon thereby produced as a product of the process.

16. The novel process of claim 15 in which said fluoride of tantalum is potassium fluotantalate.

17. The process of claim 1 in which the bromine is introduced through a hollow carbon anode.

18. A novel process which comprises electrolyzing a substantially oxygen free melt of a metal fluoride containing a polyvalent metal constituent in contact with a cathode of said polyvalent metal and a carbon anode, and introducing, as the sole remaining reactant, gaseous molecular bromine into the melt in the vicinity of the anode to produce a fluorobromocarbon and said polyvalent metal and recovering the fluorobromocarbon and polyvalent metal as products of the process.

References Cited in the file of this patent

UNITED STATES PATENTS

| 785,961 | Lyons et al. | Mar. 28, 1905 |
| 1,343,662 | Danckwardt | June 15, 1920 |
| 2,841,544 | Radimer | July 1, 1958 |

FOREIGN PATENTS

| 744,396 | Great Britain | Feb. 8, 1956 |
| 896,641 | Germany | Mar. 15, 1954 |